United States Patent [19]
Schnell

[11] 3,739,426
[45] June 19, 1973

[54] SAUSAGE MACHINE

[76] Inventor: Karl Schnell, 7065 Winterbach, Germany

[22] Filed: May 18, 1971

[21] Appl. No.: 144,528

[30] Foreign Application Priority Data
May 26, 1970 Germany..............P 20 25 620.6

[52] U.S. Cl..................................... 17/33, 17/35
[51] Int. Cl...................... A22c 11/02, A22c 11/10
[58] Field of Search ..................... 17/33, 34, 35, 41

[56] References Cited
UNITED STATES PATENTS
3,140,509    7/1964    Muller..................... 17/33
891,749      6/1908    Thompson............... 17/41

FOREIGN PATENTS OR APPLICATIONS
1,126,946    9/1968    Great Britain........................ 17/35

Primary Examiner—Lucie H. Laudenslager
Attorney—John J. McGlew and Alfred E. Page

[57] ABSTRACT

A machine for filling sausage meat into tubular casings, such as skins and the like, has a filling spout rotatable about its longitudinal axis, a braking mechanism for the discharging casing surrounding the spout in the range of its discharge end, and a retaining device preventing rotation of the formed sausage. The spout has a polygonal, and preferably triangular, cross-section at least in the range of the braking mechanism, and elastic braking rollers, or elastically applicable braking rollers, are mounted for rotation in axial planes of the spouts, each roller being aligned longitudinally with a respective polygonal face forming an entraining surface for the associated braking roller. The rollers are rotatably mounted in a rotatable retaining ring, for rotation about axes which are perpendicular to axial planes through the spout, and the rotatable ring is mounted on an arm for swinging away from the spout discharge end for placing a folded casing over the spout. The discharge end of the spout terminates in a circular cross section of the spout. A fold drawing ring surrounds the spout just upstream of the braking rollers, and has radially inwardly protruding tongues corresponding to the number of braking rollers and located angularly midway between adjacent rollers. A supporting plate for the rear end of the formed sausage is positioned between the braking mechanism and the retaining device.

14 Claims, 2 Drawing Figures

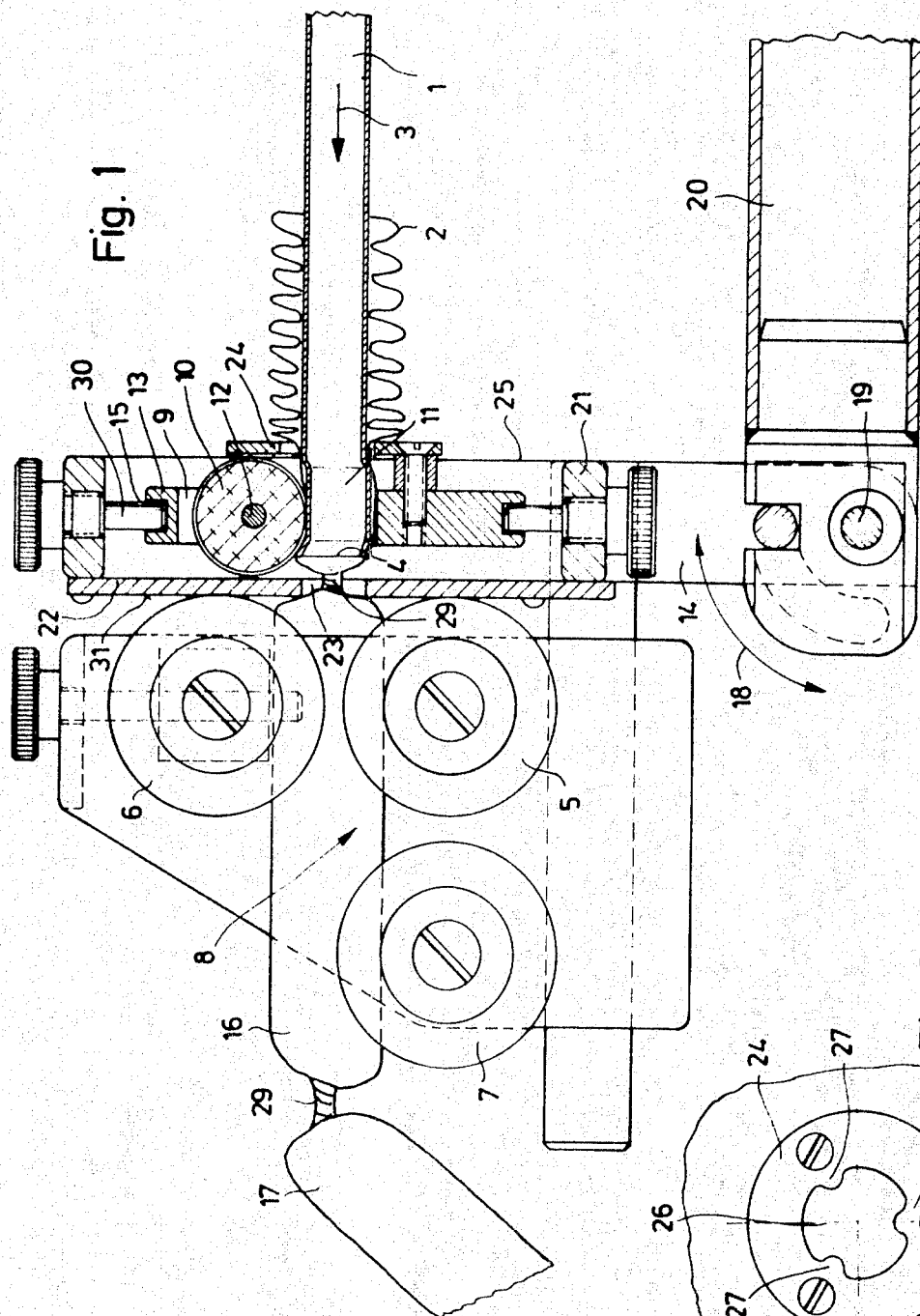
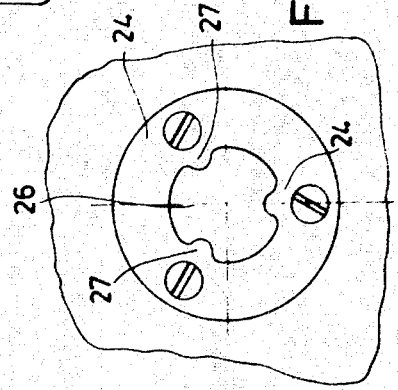
Fig. 1
Fig. 2
INVENTOR.
KARL SCHNELL
BY John G. McGlew
ATTORNEY

SAUSAGE MACHINE

BACKGROUND OF THE INVENTION

There are known machines, for filling pasty media, particularly sausage meat, into tubular casings, skins and the like, provided with a twist-off spout turning about its longitudinal axis, with braking mechanism in the range of the discharge end of the spout, to engage the discharging sausage casing placed over the spout, and with a retaining device preventing the rotation of the formed sausage. However, the construction of known machines of this type is rather complicated and consequently expensive. In order to assure synchronous rotation of the sausage casing, as well as of the pressing or braking device for the sausage casing, and thus of the casing itself, two drives, interconnected by a transmission, are used.

SUMMARY OF THE INVENTION

This invention relates to machines for filling pasty media, particularly sausage meat, into tubular casings such as skins and the like, and, more particularly, to an improved and simplified such machine capable of easier maintenance.

In accordance with the invention, the twist-off spout is formed with a polygonal, and preferably triangular, cross-section at least in the range of the braking mechanism, and the polygon faces are designed as entraining surfaces for associated elastic or elastically applicable braking rollers which are mounted to rotate substantially longitudinally of the spout, that is, substantially in axial planes through the spout. The twist-off spout, similar to prior art machines, is rotated at selected or adjustable intervals about its longitudinal axis for twisting off, that is, for forming the sausages. The casing or the skin is tied shut at a predetermined point, so that the rear end of the outgoing sausage and the front end of the new sausage to be filled are formed.

The axial widths of the braking rollers have dimensions such that all contact lines form, with the polygon faces, or, more accurately, with the casing arranged between these polygon faces and the rollers, a closed or substantially closed polygon. With this arrangement, a return of the filling material into the gathered casing on the spout is avoided. Depending upon the filling material, it further is sufficient if the ends of the contact lines of the rollers are not in contact with each other, but have a minimum spacing therebetween. The effect is particularly good when the rollers are slightly chamfered at their ends, and the chamfers of adjacent rollers bear on one another.

As stated, the polygon faces serve as entraining surfaces for the braking rollers. Since the braking rollers are elastic, or at least have an elastic periphery, the diameter of the braking rollers must be so adapted to the diameter of the spout, and the angle of the polygon corners must be so selected, that a relative rotation between the spout and the braking rollers, as viewed in a circumferential direction of the spout, is positively prevented. Twisting-off of individual sausages is possible only if the finished sausage is prevented from rotating by its retaining device and, on the other hand, the twist-off spout performs a few revolutions together with the braking mechanism.

If the axes of the braking rollers do not extend exactly perpendicular to the longitudinal axis of the twist-off spout, so that there is a certain inclination of the braking rollers relative to the spout, a further braking effect is attained, in addition to the radial pressure. As a feature of the invention, the braking rollers can be slightly swingable relative to the longitudinal spout axis for this reason. The inclination must not be too great, however, since it can lead to damage of the outgoing casing or skin. In each particular case, the material of the casing receiving the filling medium, and the cost of material for the rollers, is important.

In accordance with another feature of the invention, the twist-off spout has a circular or substantially circular cross-section at the termination of its discharge end. Since the skin of the gathered sausage casing has a circular inner cross-section, and since the spout forms, so to speak, a mandrel therefor, it is sufficient if the spout has a substantially circular cross-section with a polygonal cross-section merely at the zone of the braking rollers. Due to the circular, or substantially circular, cross-section of the discharge mouth of the spout, the sausages assume a circular cross-section during their formation. The braking rollers can bear both on the plane polygon faces and also on the transition surfaces leading to the circular terminating cross-section of the spout.

As a further feature of the invention, the braking rollers are rotatably mounted in a retaining ring arranged substantially coaxially of the twist-off spout. This retaining ring preferably is pivotally mounted so that it can be easily displaced away from the discharge end of the spout, and the gathered casing, skin, or the like can be rapidly applied over the twist-off spout. Naturally, it is also possible for the retaining ring to be removed and applied axially of the spout.

In accordance with still another feature of the invention, the retaining ring is mounted in a pivoted arm or the like and, to this end, a groove is provided on its outer circumference and is engaged by several radial pins or other sliding pieces fixedly connected with the swivel or pivoted arm. Instead of this low-cost and favorable design, it is naturally also possible to use a regular journal or an anti-friction bearing. A particular advantage, in this case, is that the pivoted or swivel arm carries the sausage retaining device, so that the latter, together with the retaining ring, can be swung aside and again brought back into the operating position, and vice versa.

As another feature of the invention, the braking rollers are constructed of sponge rubber, or are at least covered with sponge rubber on their peripheral bearing surfaces. Thus, they can move easily over the slightly thicker spout end, compared to the polygon cross-sectional portion of the spout. In addition, they thus prevent, or at least reduce, slip between the bearing surfaces of the braking roller and the outgoing casing, skin or the like. It should be added here that the twist-off spout has a particularly smooth surface, at least in the zone opposite the braking rollers. It is chrome-plated or covered with another material having good running properties, and may be polished.

Preferably, a fold drawing ring is arranged upstream of the braking mechanism, considered in the direction of travel of the sausage casing. The function of this ring is to regulate the passage of the empty casing or skin through the braking mechanism and entraining mechanism so that damage is avoided, particularly entrance of the casing or skin into the gap formed between two adjacent braking rollers. The fold drawing ring preferably is designed as a circular ring and formed with radially inwardly protruding tongues, whose number corresponds to the number of braking rollers, with the tongues being spaced angularly half-way between adjacent braking rollers, as viewed in the circumferential direction of the spout.

As a further feature, a supporting plate, for the rear sausage end, is arranged between the braking mechanism and the sausage retaining device. The sausage being formed pushes itself off on that surface of the supporting plate which is remote from the braking mechanism and entraining mechanism, so that a special feeding device, for removing the finished or forming sausages, is not necessary.

An object of the invention is to provide an improved machine for filling pasty media, particularly sausage meat, into tubular casings and the like.

Another object of the invention is to provide such a machine which is simpler than known machines of this type.

A further object of the invention is to provide such a machine in which a rotatable twist-off spout is formed with a polygonal cross-section at least in the zone adjacent braking mechanism.

Another object of the invention is to provide such a machine in which the braking mechanism comprises elastic or elastically applicable braking rollers rotating substantially in the longitudinal direction of the spout and entrained by the polygon surfaces adjacent the braking mechanism.

For an understanding of the principles of the invention, reference is made to the following description of a typical embodiment thereof as illustrated in the accompanying drawing.

BRIEF DESCRIPTION OF THE DRAWING

In the drawing:

FIG. 1 is a partial side elevation view, partly in section, of a sausage machine embodying the invention; and FIG. 2 is an elevation view of the fold drawing ring.

DESCRIPTION OF THE PREFERRED EMBODIMENT

Referring to the drawing, a gathered casing or skin 2 is placed over a twist-off spout 1, and the medium to be filled into the casing or skin, such as, for example, sausage meat, flows through this twist-off spout in the direction of arrow 3. At the discharge end or mouth 4 of spout 1, the medium flows into the skin so that a sausage is formed. The sausage passes between two rollers 5 and 6 conforming to the cross-section of the sausage and which represent, together with roller 7, the most important parts of a retaining device 8. Rollers 5 and 7 are arranged in series in the direction of flow. The bearing surfaces of rollers 5, 6 and 7 are rough or corrugated in order to assure a firm engagement with the sausages. The function of this retaining device will be described later. The meat or other medium is fed to the twist-off spout 1 by means of a pump which has not been shown. In addition, twist-off spout 1 is provided with a drive which rotates the spout at certain intervals with breaks inbetween. During rotation of twist-off spout 1, the applied gathered skin 2 also rotates and, in order to avoid relative rotation between the skin or casing and the spout, a special braking mechanism 9 is provided. Braking mechanism 9 consists substantially of three braking rollers 10 bearing uniformly on the circumference of twist-off spout 1 in the range of the front or discharge end of the latter. Rollers 10 may consist of sponge rubber, or at least be covered with sponge rubber on their peripheral contact or bearing surfaces.

Twist-off spout 1 has a circular cross-section generally, but in the range 11 of braking rollers 10 it is deformed to an equilateral triangle, so that three plane contact surfaces for the peripheral surfaces of braking rollers 10 are formed. The braking rollers are sufficiently wide that there chamfered roller ends contact each other or are almost in contact with each other. Mouth 4, at its terminating end, is again circular or substantially circular in its cross-section.

The three braking rollers 10 are rotatably mounted by means of respective axles 12 in a retaining ring 13 which is, in turn, rotatably mounted in a swivel arm 14. For this purpose, a peripheral groove 15 is provided in retaining ring 13, and fixed sliding pins 30, arranged uniformly on the circumference of the ring-shaped part of swivel arm 14, extend into groove 15. As soon as twist-off spout 1 is rotated by its drive, which has not been shown, about its longitudinal axis, the polygon faces of the triangular front end of the twist-off spout entrain braking rollers 10 which, in turn, effect rotation of retaining ring 13. Since the casing or skin is pressed by braking rollers 10 against the polygonal faces of the twist-off spout, the casing or skin automatically rotates with the spout and with the rollers. On the other hand, the stuffed sausage is retained by the retaining device 8, previously mentioned, substantially by rollers 5, 6 and 7, so that the casing or skin is positively crossed or twisted at a point between retaining device 8 and braking rollers 10. This point forms, later, the connecting piece or section 29 between two adjacent sausages 16 and 17.

Swivel arm 14 can pivot in the direction of double arrow 18 about a pivot 19 in supporting pipe 20. Since retaining device 8 is fixedly connected with swivel arm 14, the retaining device is also swung away from the operative position, or brought back into the operating position, when the braking and entraining mechanism is swung. During the swinging, braking rollers 10 move over mouth 4 of twist-off spout 1 but, because of the elasticity of each roller, or the elasticity of a support thereof, which has not been shown, in a radial direction, the rollers can move easily over mouth 4 despite the curved path of movement and despite the slightly thicker free spout end, as compared to range 11 of spout 1. Such swinging out has merely the purpose of permitting rapid and reliable application of a new gathered casing or skin over spout 1. Naturally, the swing-out arrangement also has advantages from the standpoint of maintenance, repairs and cleaning. It will be noted that axle 19 is mounted eccentrically, so that arm 14 may be latched in an upright position and readily released from latching engagement with support 20.

As viewed in the direction 3 of the flow of the material, a supporting plate 22 is arranged downstream of the ring-shaped part 21 of swivel arm 14 and is connected to arm 14 or to part 21. A central aperture 23 of supporting plate 22 is positioned concentrically of twist-off spout 1 and, in addition, its diameter is smaller than that of the sausages 16 and 17. The formed and filled sausage is supported with its end facing supporting plate 22, which end is not identical during formation of the sausage with the later rear end of the sausage, so that supporting plate 22 and its forward facing surface 31, respectively, absorb the supporting forces of the sausage issuing through aperture 23.

FIG. 2 illustrates a so-called fold drawing ring 24 which is also secured on swivel arm 14, but on the rear surface 25 thereof, or upstream in the direction of flow. Ring 24 has three tongues 27 uniformly angularly spaced about its inner periphery and extending into a central aperture 26. Generally speaking, as many tongues 27 are provided on ring 24 as there are braking rollers 10. The associate between braking rollers 10 and tongues 27 is such that the tongues are aligned exactly with the bisectors of the angle formed by two adjacent braking rollers. The tongues 27 have the function of imparting to the casing or skin, fed to the braking rollers 10, a certain cross-sectional form, and of preventing penetration of the skin, which is still empty at this point, into the wedge-shaped space formed by adjacent rollers. Actually, it is not so much the prevention of such penetration as of damage to the empty skin during the passage through the contact point of two adjacent rollers 10.

While a specific embodiment of the invention has been shown and described in detail to illustrate the application of the principles of the invention, it will be understood that the invention may be embodied otherwise without departing from such principles.

What is claimed is:

1. In a machine for filling pasty media, particularly sausage meat, into tubular casings, skins and the like, and of the type having a filling spout rotatable about its longitudinal axis, a braking mechanism, for the discharging casing, surrounding the spout in the range of its discharge end in the discharge direction, and a retaining device preventing rotation of the formed sausage, the improvement comprising, in combination, said spout having a polygonal cross-section, with planar polygonal surfaces, at least in the range of said braking mechanism; and elastically applicable braking rollers, having planar peripheral bearing surfaces, mounted for rotation substantially in axial planes of said spout and each aligned longitudinally with the respective planar polygonal face of said spout forming an entraining surface for the planar peripheral bearing surface of the associated braking roller.

2. In a machine for filling pasty media, the improvement claimed in claim 1, in which the axes of rotation of said braking rollers extend at an angle of substantially 90° to the longitudinal axis of the casing.

3. In a machine for filling pasty media, the improvement claimed in claim 1, in which the extreme end of the discharge portion of said spout has at least a substantially circular cross-section.

4. In a machine for filling pasty media, the improvement claimed in claim 1, comprising a retaining ring rotatably mounting said braking rollers and arranged substantially coaxially with said twist-off spout.

5. In a machine for filling pasty media, the improvement claimed in claim 1, in which said braking rollers are formed of sponge rubber.

6. In a machine for filling pasty media, the improvement claimed in claim 1, including a supporting plate, for the rear end of a formed sausage, positioned between said braking mechanism and said retaining mechanism.

7. In a machine for filling pasty media, particularly sausage meat, into tubular casings, skins and the like, and of the type having a filling spout rotatable about its longitudinal axis, a braking mechanism, for the discharging casing, surrounding the spout in the range of its discharge end in the discharge direction, and a retaining device preventing rotation of the formed sausage, the improvement comprising, in combination, said spout having a polygonal cross-section at least in the reange of said braking mechanism; elastically applicable braking rollers mounted for rotation substantially in axial planes of said spout and each aligned longitudinally with the respective polygonal face of said spout forming an entraining surface for the associated braking roller; a retaining ring rotatably mounting said braking rollers and arranged substantially coaxially with said twist-off spout; and means mounting said retaining ring for swinging away from said spout.

8. In a machine for filling pasty media, the improvement claimed in claim 7, in which said means is a pivotally mounted swivel arm.

9. In a machine for filling pasty media, the improvement claimed in claim 8, in which said retaining device is mounted on said swivel arm.

10. In a machine for filling pasty media, the improvement claimed in claim 9, in which the peripheral bearing surfaces of said braking rollers are covered with sponge rubber.

11. In a machine for filling pasty media, the improvement claimed in claim 8, in which said retaining ring is rotatably mounted in said swivel arm.

12. In a machine for filling pasty media, the improvement claimed in claim 11, in which said retaining ring is rotatably mounted in a ring-shaped portion of said swivel arm, and has a peripheral groove engaged by a plurality of radially inwardly extending pins mounted in said ring-shaped portion of said swivel arm.

13. In a machine for filling pasty media, particularly sausage meat, into tubular casings, skins and the like, and of the type having a filling spout rotatable about its longitudinal axis, a braking mechanism, for the discharging casing, surrounding the spout in the range of its discharge end in the discharge direction, and a retaining device preventing rotation of the formed sausage, the improvement comprising, in combination, said spout having a polygonal cross-section at least in the range of said braking mechanism; elastically applicable braking rollers mounted for rotation substantially in axial planes of said spout and each aligned longitudinally with the respective polygonal face of said spout forming an entraining surface for the associated braking roller; and a fold drawing ring positioned upstream of said braking mechanism considered in the direction of flow of the media.

14. In a machine for filling pasty media, the improvement claimed in claim 13, in which said fold drawing ring is circular and is formed with radially inwardly projecting tongues on its inner periphery; the number of tongues corresponding to the number of braking rollers and each tongue being positioned angularly midway between a pair of circumferentially adjacent braking rollers.

* * * * *